(12) United States Patent
Eshima

(10) Patent No.: US 8,569,624 B2
(45) Date of Patent: Oct. 29, 2013

(54) CONDUCTING PATH

(75) Inventor: Hirotaka Eshima, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 5 days.

(21) Appl. No.: 13/067,244

(22) Filed: May 18, 2011

(65) Prior Publication Data

US 2012/0111604 A1    May 10, 2012

(30) Foreign Application Priority Data

Nov. 4, 2010 (JP) ................................ 2010-247414

(51) Int. Cl.
*H01R 4/10* (2006.01)

(52) U.S. Cl.
USPC ........................................ 174/84 C; 174/115

(58) Field of Classification Search
USPC ................................ 174/113 R, 78, 84 C, 115
See application file for complete search history.

(56) References Cited

U.S. PATENT DOCUMENTS

| | | | | |
|---|---|---|---|---|
| 1,089,642 | A | | 3/1914 | Honold |
| 1,504,630 | A | * | 8/1924 | Lilleberg ................ 174/71 R |
| 2,218,830 | A | * | 10/1940 | Rose et al. ................ 343/905 |
| 3,032,604 | A | * | 5/1962 | Timmons ................ 174/115 |
| 3,328,510 | A | * | 6/1967 | White ................ 174/41 |
| 3,800,062 | A | | 3/1974 | Kataoka et al. |
| 4,374,299 | A | * | 2/1983 | Kincaid ................ 174/36 |
| 5,073,126 | A | * | 12/1991 | Kikuchi et al. ................ 439/452 |
| 5,230,488 | A | * | 7/1993 | Condon ................ 248/73 |
| 5,765,786 | A | | 6/1998 | Gretz |
| 6,943,300 | B2 | | 9/2005 | Ekeberg et al. |
| 7,490,630 | B2 | | 2/2009 | Coupe |
| 7,550,674 | B2 | | 6/2009 | Jean |
| 7,653,987 | B2 | | 2/2010 | Tokuda et al. |
| 8,033,512 | B2 | | 10/2011 | Lien |
| 2007/0234559 | A1 | | 10/2007 | Tokuda et al. |
| 2009/0016843 | A1 | * | 1/2009 | Komsitsky et al. ............ 411/105 |
| 2009/0294149 | A1 | * | 12/2009 | Watanabe et al. ......... 174/102 R |
| 2012/0112014 | A1 | * | 5/2012 | Eshima et al. ................ 248/68.1 |
| 2012/0186845 | A1 | * | 7/2012 | Eshima et al. ................ 174/15.6 |

FOREIGN PATENT DOCUMENTS

| | | |
|---|---|---|
| JP | 2007-031057 | 2/2007 |
| JP | 2007-053886 | 3/2007 |
| JP | 2007-276738 | 10/2007 |
| JP | 2008-148446 | 6/2008 |

OTHER PUBLICATIONS

United States Office Action dated Nov. 7, 2012, in U.S. Appl. No. 13/200,922.
Office Action dated Dec. 12, 2012 in U.S. Appl. No. 13/067,242.
Office Action dated Apr. 16, 2013 in U.S. Appl. No. 13/200,922.
Office Action dated May 23, 2013 in U.S. Appl. No. 13/067,242.

\* cited by examiner

*Primary Examiner* — Chau Nguyen

(74) *Attorney, Agent, or Firm* — McGinn IP Law Group, PLLC

(57) ABSTRACT

A conducting path includes three cables, and a cable clamp for fixing the three cables. The cable clamp includes a metal plate formed along an outer periphery of the three cables that are triangularly arranged when viewed in cross-section and a mounting flange portion formed with both end portions of the metal plate overlapped each other, and two of the three cables are integrated to form an integral cable.

9 Claims, 3 Drawing Sheets

| 10 CONDUCTING PATH |
| 1 CABLE CLAMP |
| 2 CABLE |
| 3 METAL PLATE |
| 4 MOUNTING FLANGE PORTION |
| 11 INTEGRAL CABLE |
| 12 ENGAGING GROOVE |
| 13 ENGAGING PROJECTION |

| 20 CONDUCTING PATH |
| 21 CABLE CLAMP |
| 2 CABLE |
| 3 METAL PLATE |
| 4 MOUNTING FLANGE PORTION |
| 11 INTEGRAL CABLE |
| 12 ENGAGING GROOVE |
| 13 ENGAGING PROJECTION |

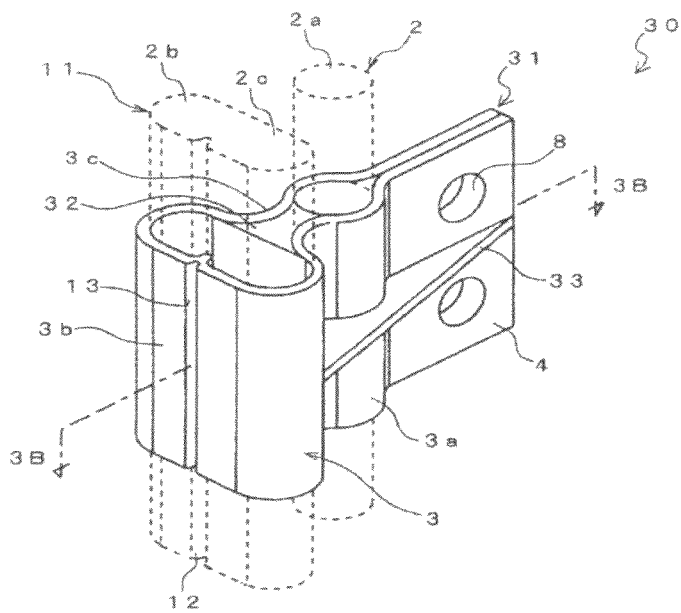
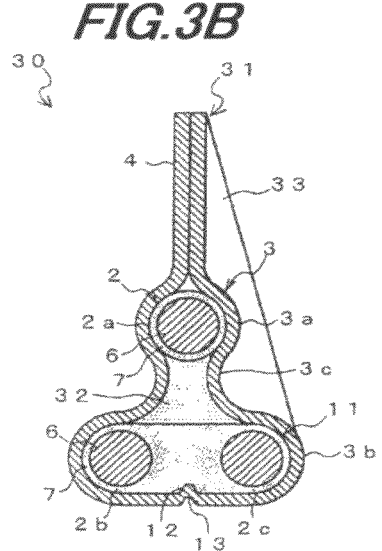
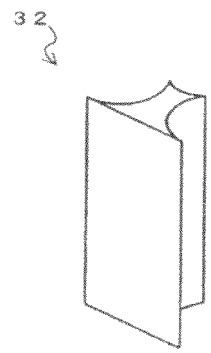
32 CABLE SUPPORT MEMBER
33 RIB

CONDUCTING PATH

The present application is based on Japanese Patent Application No. 2010-247414 filed on Nov. 4, 2010, the entire contents of which are incorporated herein by reference.

BACKGROUND OF THE INVENTION

1. Field of the Invention

The invention relates to a conducting path (i.e., electrically-conducting path) in which three cables are wired.

2. Related Art

In a conducting path in which three cables are wired, it is necessary to fix the cables at a predetermined position. Various types of conventional cable clamps used therefor have been developed.

There are cable clamps of, e.g., the type described in JP-A-2007-276738, JP-A-2007-31057 and JP-A-2007-53886, i.e., a linear type in which three cables are arrayed in a straight line when viewed in cross-section, or of the type described in JP-A-2008-148446, i.e., a triangular type in which three cables are triangularly-arrayed when viewed in cross-section.

The former, which is a linear type cable clamp, has a problem that a wiring space in an array direction of cables increases and a mounting space also increases since it is necessary to form two attaching portion at both ends in the array direction of the cable when, e.g., mounting on a car body, etc.

Accordingly, the inventors focused on the latter which is a triangular type cable clamp and considered that, as a result of the study, the triangular type cable clamp is effective not only in that saving of the mounting space can be realized since mounting to a car body, etc., can be achieved by one attaching portion but also in that cable arrangement in a triangular shape when viewed in cross-section contributes to realize saving of wiring space.

SUMMARY OF THE INVENTION

However, the cable clamp of JP-A-2008-148446 as a conventional triangular type cable clamp has following problems. The problems are significant especially when used on vehicle.

Since the cable clamp of JP-A-2008-148446 has a support metal fitting which has a two-piece structure, workability of cable wiring is poor due to assembly process of the support metal fitting.

In addition, the cable clamp of JP-A-2008-148446 requires to insert a cable through a cable insertion hole of a cable support member which is held by the support metal fitting, and thus, the workability of cable wiring is poor.

Furthermore, in the cable clamp of JP-A-2008-148446, the wiring space for the cable clamp as a cable fixing portion is large since the support metal fitting and the cable support member have a circular shape even though arrangement itself of three cables is triangular, hence, there is a room for improvement in space saving.

Meanwhile, vibration is a problem in a cable clamp for vehicle. In the cable clamp of JP-A-2008-148446, rotation of the cable support member with respect to the support metal fitting may be caused by vibration since the cable support member held by the support metal fitting is in a circular shape and it is not desirable in view of positioning of the cable.

Furthermore, since the cable clamp of JP-A-2008-148446 has a configuration in which the cable is inserted through the cable insertion hole of the cable support member, a gap is generated between the cable support member and the cable, the cable is likely to be shifted with respect to the support metal fitting due to vibration and it is not desirable in view of positioning of the cable.

When the cable is not properly positioned, i.e., when the cable is not firmly fixed to the cable clamp, the cable is twisted and becomes easy to be broken by unnecessary force applied thereto and, in addition, wiring layout is changed from the intended layout due to the twist of the cable, which may result in failure caused by interference, etc., of the cable with surrounding members.

Accordingly, it is an object of the invention to provide a conducting path which improves workability at the time of wiring a cable, can realize space saving and also allows firm fixation of the cable to a cable clamp.

(1) According to one embodiment of the invention, a conducting path comprises:

three cables; and a cable clamp for fixing the three cables, wherein the cable clamp comprises a metal plate formed along an outer periphery of the three cables that are triangularly arranged when viewed in cross-section and a mounting flange portion formed with both end portions of the metal plate overlapped each other, and two of the three cables are integrated to form an integral cable.

In the above embodiment (1) of the invention, the following modifications and changes can be made.

(i) An engaging groove is formed on the integral cable, and an engaging projection for engagement with the engaging groove is formed on the metal plate of the cable clamp.

(ii) The integral cable comprises two opposing planar portions between the two cables, the cable clamp further comprises a cable support member arranged between one of the cables and the integral cable so as to support the one of the cables and the integral cable, the cable support member has a trapezoidal shape when viewed in cross-section that an upper base thereof is formed in an arc shape so as to fit to a portion of an outer periphery of the one cable, a lower base horizontally wider than the upper base is formed flat so as to contact with the planar portion of the integral cable, and two sides each connecting an endpoint of the upper base to that of the lower base on both sides are constricted sides which are inwardly narrowed, and the metal plate is formed along the outer periphery of the integral cable comprising the planar portion that is not in contact with the cable support member, is subsequently formed along the constricted sides of the cable support member, and is finally formed along both sides of an outer periphery of the remaining one cable.

(iii) The conducting path further comprises:

a deformation preventing rib extending from a surface of the mounting flange portion opposite to a mounting surface to the metal plate along the outer peripheries of the one of the cables and the integral cable for preventing deformation of the mounting flange portion.

Points of the Invention

According to one embodiment of the invention, a conducting path is constructed such that two cables are formed as an integral cable such that two center conductors are covered with an insulation so as not to have a gap around the cables, unlike the conventional conducting path whose cable clamp needs the insertion of cables through a cable insertion hole. Therefore, it is possible to firmly fix and position the cables without the gap around the cables. In addition, since there is no need for inserting the cables through the cable insertion hole as needed before, it is possible to improve the workability in wiring the cables.

BRIEF DESCRIPTION OF THE DRAWINGS

Next, the present invention will be explained in more detail in conjunction with appended drawings, wherein:

FIGS. 1A and 1B are views showing a conducting path in an embodiment of the present invention, wherein FIG. 1A is a perspective view and FIG. 1B is a 1B-1B line cross-sectional view thereof;

FIGS. 2A and 2B are views showing a conducting path in an embodiment of the invention, wherein FIG. 2A is a perspective view and FIG. 2B is a 2B-2B line cross-sectional view thereof; and FIGS. 3A to 3C are views showing a conducting path in an embodiment of the invention, wherein FIG. 3A is a perspective view, FIG. 3B is a 3B-3B line cross-sectional view thereof and FIG. 3C is a perspective view of a cable support member.

DESCRIPTION OF THE PREFERRED EMBODIMENTS

A preferred embodiment of the invention will be described below in conjunction with the appended drawings.

Figure 1A:
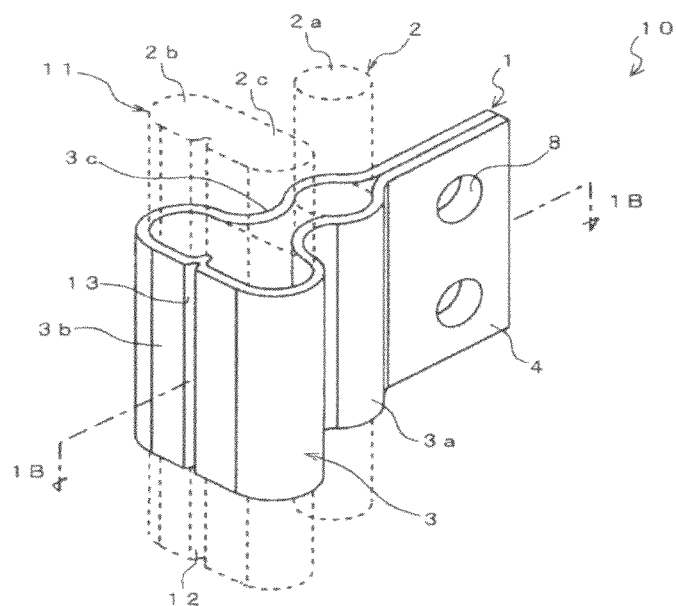
Figure 1B:
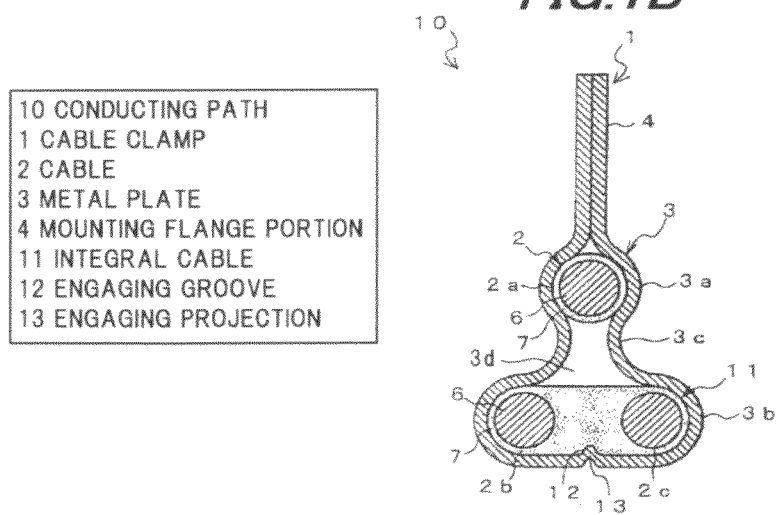

FIGS. 1A and 1B are views showing a conducting path in the present embodiment, wherein FIG. 1A is a perspective view and FIG. 1B is a 1B-1B line cross-sectional view thereof.

As shown in FIGS. 1A and 1B, a conducting path 10 is provided with three cables 2 (2a, 2b and 2c) and a cable clamp 1 for fixing the three cables 2.

The three cables 2 are to provide electrical power to, e.g., an in-wheel motor built-in a wheel, and the cable clamp 1 is used for, e.g., fixing the three cables 2 which extend from the in-wheel motor, to a car body.

Although each of the three cables 2 used here is composed of a center conductor 6 and an insulation 7 covering a periphery of the of the center conductor 6, it is not limited thereto and a cable provided with an outer conductor for shielding (i.e., a coaxial cable) may be used.

The cable clamp 1 is provided with a single metal plate 3 formed along an outer periphery of three cables 2 which are triangularly arranged when viewed in cross-section and a mounting flange portion 4 formed overlapping both end portions of the metal plate 3 each other. Although the details will be described later, two of the three cables 2 are integrated in the conducting path 10 of the invention, and in more detail, the three cables 2 are arranged so that the center conductors 6 thereof form a triangle when viewed in cross-section.

The metal plate 3 is in a strip shape, and has the mounting flange portion 4 composed of the both end portions of the strip-shaped metal plate 3 overlapped each other so as to have a plate-like shape, a first holding portion 3a formed on the proximal side of the mounting flange portion 4 to hold the cable 2a (a cable on the upper side in FIG. 1B) which is one of the three cables 2 arranged triangularly when viewed in cross-section, and a second holding portion 3b formed on a side of the first holding portion 3a opposite to the mounting flange portion 4 to hold the integrated remaining two cables 2b and 2c (two cables on the lower side in FIG. 1B).

The first holding portion 3a is formed along the outer periphery of the cable 2a so as to have a substantially circular shape when viewed in cross-section, and the second holding portion 3b is formed along the outer periphery of the cables 2b and 2c so as to have a substantially oval shape when viewed in cross-section (a shape composed of two parallel straight lines and two arc-shaped curved lines which connect end portions of the two straight lines). A necked portion 3c is formed between the two holding portions 3a and 3b so as to smoothly connect therebetween at the necked portion 3c. Here, a gap 3d is formed between both sides of the metal plate 3 by which the necked portion 3c is defined, and, via the gap 3d, a space for holding the cable 2a communicates with a space for holding the cables 2b and 2c.

The mounting flange portion 4 is provided so as to extend from the first holding portion 3a toward the side opposite to the second holding portion 3b (upward in FIG. 1B), i.e., so as to protrude outward from a vertex of a triangle formed by the triangularly-arranged cables 2. It should be noted that the position of the mounting flange portion 4 is not limited thereto. For example, the mounting flange portion 4 may be provided so as to extend downward (downward in FIG. 1B) from the second holding portion 3b and appropriate changes can be made in accordance with a shape, etc., of the mounting space to where the cable clamp 1 is mounted.

Through-holes 8 for passing a fixing bolt (not shown) are formed on the mounting flange portion 4. A bolt is passed through the through-hole 8 and is then fixed to a structural body as a mounting target (a car body, etc.) using a nut, etc., thereby fixing the cable clamp 1 to the structural body as a mounting target.

In the conducting path 10 of the present embodiment, two cables 2b and 2c among the three cables 2a to 2c form an integral (or combined) cable 11.

Although the case where the integral cable 11 is the entirety of the two cables 2b and 2c throughout a longitudinal direction will be described here, it is not limited thereto, and it is acceptable as long as at least portions of the two cables to be fixed to the cable clamp 1 are integrated.

The integral cable 11 has the insulation 7 shared by the two cables 2b and 2c, which is a structure to cover the two center conductors 6 with the common insulation 7. The integral cable 11 is formed in a substantially oval shape when viewed in cross-section (a shape composed of two parallel straight lines and two arc-shaped curved lines which connect end portions of the two straight lines) and a space between the two center conductors 6 is filled with the insulation 7 which has two opposing planar portions. In other words, the integral cable 11 has two opposing planar portions between the two cables 2b and 2c.

A size in cross section of the integral cable 11 is desirably formed to be slightly larger than a space enclosed by the second holding portion 3b. This causes that the integral cable 11 is squeezed by the metal plate 3 when the integral cable 11 is held by the second holding portion 3b, and it is thus possible to firmly fix the integral cable 11 to the metal plate 3.

An engaging groove 12 is formed on the integral cable 11 along a longitudinal direction thereof. The engaging groove 12 is formed on one side of the insulation 7 (lower side in FIG. 1B) at the middle portion in an array direction of the center conductors 6. In other words, the engaging groove 12 is formed on the planar portion which is one of the two opposing planar portions between the two cables 2b and 2c and is in contact with the metal plate 3. Meanwhile, an engaging projection 13 for engagement with the engaging groove 12 of the integral cable 11 is formed on the second holding portion 3b by bending a portion of the metal plate 3. The engaging groove 12 and the engaging projection 13 are to suppress a positional shift of the integral cable 11 with respect to the metal plate 3.

Although it is necessary to divide the integral cable 11 into two cables 2b and 2c for connection to a device such as an in-wheel motor, it is easy to divide the integral cable 11 of the conducting path 10 since it is possible to divide the integral cable 11 with reference to the engaging groove 12, i.e., along the engaging groove 12. That is, the engaging groove 12 includes both a function of dividing a cable and a function of suppressing a positional shift.

For fixing the three cables 2a to 2c to the cable clamp 1, firstly, in the state that the both end portions of the metal plate 3 (i.e., the mounting flange portion 4) are opened, the integral cable 11 formed by integrating the cables 2b and 2c is arranged so that the planar portion thereof contacts the metal plate 3. Then, the opening is closed by pulling together the both end portions of the metal plate 3 so as to house the integral cable 11 in the second holding portion 3b. Meanwhile, while the both end portions of the metal plate 3 are pulled together, the cable 2a is housed in the first holding portion 3a, and the both end portions of the metal plate 3 (the mounting flange portion 4) are closed in this state.

Here, the integral cable 11 easily comes in contact with the metal plate 3 since the integral cable 11 has the planar portion, and as a result, it is easy to pull and join the both end portions of the metal plate 3.

Then, by joining the both end portions of the metal plate 3 (the mounting flange portion 4) to allow the opening to be closed, the metal plate 3 is deformed such that the space in the second holding portion 3b is narrowed. Therefore, the integral cable 11 (cables 2b and 2c) are held by the second holding portion 3b and the integral cable 11 (cables 2b and 2c) are firmly fixed to the metal plate 3. Likewise, the cable 2a is held by the first holding portion 3a and is firmly fixed to the metal plate 3. By tightening a bolt which is inserted into the through-hole 8, it is possible to fix the cable clamp 1 to a structural body as a mounting target and, at the same time, to close the both end portions of the metal plate 3 (the mounting flange portion 4).

In sum, the metal plate 3 of the present embodiment is formed along the outer periphery of the integral cable 11 in order to form the second holding portion 3b for holding the integral cable 11, and is subsequently formed along both sides of the outer periphery of the cable 2a in order to form the first holding portion 3a for holding the remaining cable 2a.

Such a configuration not only allows firm fixation of the three cables 2 to the metal plate 3 but also significantly improves workability as compared to the case of separately arranging the three cables 2 to the metal plate 3.

Furthermore, the invention is characterized in a combination of cables, which is a combination of the integral cable 11 formed by integrating the two cables 2b and 2c and the single cable 2a. Since such a combination of cables allows the metal plate 3 to horizontally (from both sides) hold each cable (the integral cable 11 and the cable 2a) as shown in FIG. 1B, it is possible to firmly fix each cable.

Effects of the Embodiment

The effects of the present embodiment will be described below.

In the conducting path 10 of the present embodiment, the cable clamp 1 is used which is provided with the single metal plate 3 formed along the outer periphery of the three cables 2 which are triangularly arranged when viewed in cross-section and the mounting flange portion 4 formed by joining the both end portions of the metal plate 3 together, and the two cables 2b and 2c among the three cables 2 form the integral cable 11.

Since the cables 2b and 2c form the integral cable 11, the insulation 7 between the center conductors 6 functions to support the cables 2b and 2c between the insulation 7 and the metal plate 3, and it is thus possible to firmly fix the integral cable 11 (the cables 2b and 2c) to the metal plate 3. Therefore, it is possible to suppress the positional shift of the cables 2b and 2c caused by vibration even when the conducting path 10 is used on vehicle.

In addition, the integral cable 11 formed by the cables 2b and 2c facilitates handling of the cables 2 as compared to the case where the cables 2b and 2c are not integrated, and thus, the work to fix the cables 2 to the cable clamp 1 is facilitated. Therefore, it is possible to improve workability at the time of wiring the cables 2.

A configuration in which the cables 2b and 2c are individually held by holding portions formed by shaping a portion of the metal plate 3 into a C-shape without integrating the cables 2b and 2c may be an alternative. However, in this case, the cables 2b and 2c are not sufficiently held even though the both end portions of the metal plate 3 (the mounting flange portion 4) are closed, and a positional shift of the cables 2b and 2c may occur due to vibration. This is because, although the both end portions of the metal plate 3 (the mounting flange portion 4) are closed, deformation generated by the closure may not act in a direction to hold the cables 2b and 2c since the cables 2 are triangularly-arranged.

Meanwhile, directly holding the cables 2b and 2c by the second holding portion 3b without integrating the cables 2b and 2c may be an alternative, however, there is a possibility that the cables 2b and 2c are excessively deformed in this case, and this deformation may cause breakage of the cables 2b and 2c or deterioration in electrical characteristics of the cables 2b and 2c.

In addition, when the cables 2 are fixed only by the metal plate 3 without integrating the cables 2b and 2c, the metal plate 3 may be deformed by external force or the cables 2 may not be firmly fixed due to defective process of the metal plate 3. However, since the conducting path 10 of the invention allows firmer fixation of the cables 2b and 2c by forming the integral cable 11 from the cables 2b and 2c, the shape can be maintained and the cables 2 can be firmly fixed even if deformation of the metal plate 3 due to external force occurs or the metal plate 3 is defectively processed. Therefore, it is possible to improve reliability.

In addition, in the conducting path 10, since the cables 2b and 2c are formed as the integral cable 11 such that the two center conductors 6 are covered with the insulation 7 to form the integral cable 11, a gap is not generated around the cable, unlike the conventional cable clamp which requires insertion of a cable through a cable insertion hole. Therefore, it is possible to firmly fix and position the cables 2b and 2c. In addition, since there is no need for the work to insert a cable through a cable insertion hole which is conventionally required, it is possible to improve the workability at the time of wiring the cables 2.

Furthermore, the conducting path 10 does not require a conventional assembly work since the metal plate 3 does not have a separable structure, and it is thus possible to improve the workability at the time of wiring the cables 2.

Still further, in the conducting path 10, since the metal plate 3 is formed along the outer periphery of the three cables 2 which are triangularly arranged when viewed in cross-section, it is possible to downsize the entire cable clamp 1 and thus to reduce the wiring space for the cable clamp 1, thereby contributing to the space saving. In addition, since the rotation of the integral cable 11 due to vibration does not occur, it is possible to firmly fix and position the cables 2b and 2c.

In addition, in the conducting path 10, it is possible to suppress the positional shift of the integral cable 11 with respect to the metal plate 3 since the engaging groove 12 is formed on the integral cable 11 and the engaging projection 13 for engagement with the engaging groove 12 is formed on the metal plate 3 of the cable clamp 1.

Other Embodiments

The other embodiments of the invention will be described below.

Figure 2A:
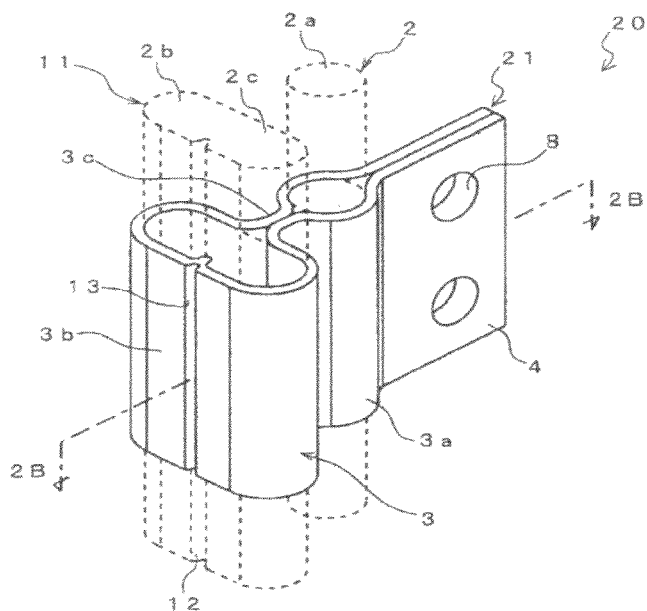
Figure 2B:
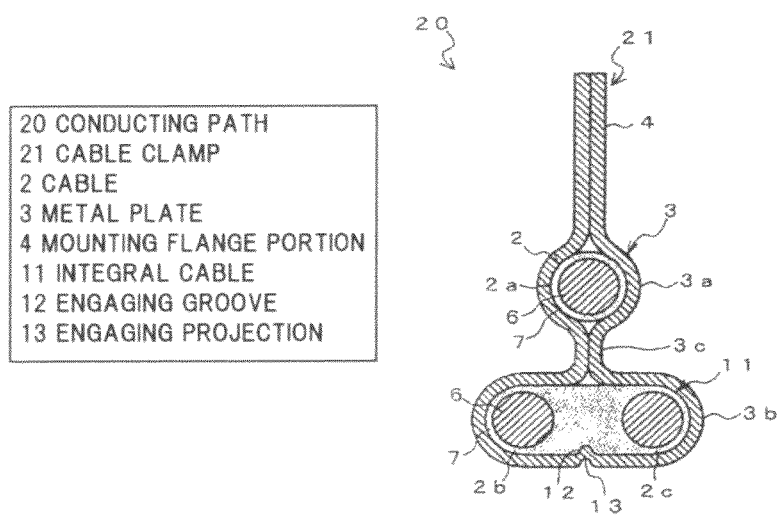

A conducting path 20 shown in FIGS. 2A and 2B basically has the same configuration as the conducting path 10 of FIG. 1, except use of a cable clamp 21 in which a gap is not formed in the both sides of the metal plate 3 which form the necked portion 3c in order to separate the space for holding the cable 2a from the space for holding the cables 2b and 2c. The same effect as the above-mentioned conducting path 10 can be obtained even though the space for holding the cable 2a is separated from the space for holding the cables 2b and 2c by the necked portion 3c.

A conducting path 30 shown in FIGS. 3A to 3C basically has the same configuration as the conducting path 10 of FIG. 1, except use of a cable clamp 31 provided with a cable support member 32 which is provided between the single cable 2a and the integral cable 11 so as to support the single cable 2a and the integral cable 11.

The cable support member 32 is formed to have a length substantially the same as the width of the metal plate 3 (a vertical length in FIG. 3A), and is formed in a shape along the outer peripheries of the cable 2a and the integral cable 11 as well as along an inner surface of the metal plate 3 (i.e., a shape which fills the space between the cable 2a and the integral cable 11). The cable support member 32 is formed of metal such as aluminum, resin or rubber.

In more detail, as shown in FIG. 3B, the cable support member 32 has a trapezoidal shape when viewed in cross-section, in which an upper base thereof is formed in an arc shape so as to fit to a portion of an outer periphery of the single cable 2a, a lower base horizontally wider than the upper base is formed flat so as to contact with the planar portion of the integral cable 11, and two sides each connecting an endpoint of the upper base to that of the lower base on both sides are constricted sides which are inwardly narrowed. And the cable support member 32 is configured so that the necked portion 3c of the metal plate 3 fits to the constricted sides.

The metal plate 3 shown in FIG. 3A to 3C as another mode of the present embodiment is formed along the outer periphery of the integral cable 11 including the planar portion not in contact with the cable support member 32 in order to form the second holding portion 3b for holding the integral cable 11, is subsequently formed along the constricted sides of the cable support member 32, and is finally formed along both sides of the outer periphery of the cable 2a in order to form the first holding portion 3a for holding the remaining cable 2a.

In the conducting path 30, it is possible to firmly fix the cable 2a and the integral cable 11, i.e., all of the three cables 2a to 2c, to the metal plate 3 by using the cable support member 32.

In the configuration shown in FIG. 3A to 3C, the shape of the metal plate 3 may be designed such that a force is downwardly applied to the cable support member 32, i.e., is applied toward the integral cable 11 when the necked portion 3c of the metal plate 3 is fitted to the constricted sides of the cable support member 32. The configuration described above allows stronger fixation of the integral cable 11 to the cable clamp 31.

Furthermore, in the cable clamp 31 of the conducting path 30, a deformation preventing rib 33 is formed so as to extend from a surface of the mounting flange portion 4 opposite to a mounting surface, i.e., from a surface on a side where a head of a bolt is located when the bolt is attached (a front right surface in FIG. 3A) to the metal plate 3 along the outer periphery of the three cables 2a to 2c (the single cable 2a and the integral cable 11) (extension up to the second holding portion 3b, here). The deformation preventing rib 33 is to prevent deformation of the mounting flange portion 4, and is formed so as to extend perpendicular to the mounting flange portion 4. Although not mentioned in the conducting paths 10 and 20 of FIGS. 1 and 2, the cable clamps 1 and 21 of the conducting paths 10 and 20 also may be provided with the deformation preventing rib 33 in order to prevent deformation of the mounting flange portion 4.

It should be noted that the present invention is not intended to be limited to the above-mentioned embodiments, and it is obvious that the various kinds of changes can be added without departing from the gist of the present invention.

Although the integral cable 11 is formed such that, e.g., the insulation 7 is shared by the two cables 2b and 2c in the above-mentioned embodiment, it is not limited thereto, and the two cables 2b and 2c may be integrated by molding with resin to form the integral cable 11.

In addition, for example, the two cables 2b and 2c (which are composed of only the center conductor 6 in more precise terms but may be center conductors 6 with a multi-layer or single-layer coating) are integrated by the shared insulation 7 to form the integral cable 11 and the cables 2b and 2c are adhered tightly to the insulation 7 not to relatively move even if bent in the above-mentioned embodiment, however, it is not limited thereto, and it may be configured that the cables 2b and 2c are intentionally weakly adhered to the insulation 7 so as to relatively move when the integral cable is bent. By configuring as described above, for example, stress is not applied between the cables located on the outer side and the insulation 7 when the integral cable is bent in one horizontal direction in FIG. 1B. Thus, there is no possibility of failure such as, e.g., splitting or elongation of the insulation 7.

What is claimed is:

1. A conducting path, comprising:
    three cables; and
    a cable clamp for fixing the three cables,
    wherein the cable clamp comprises a single metal plate formed along an outer periphery of the three cables that are triangularly arranged when viewed in cross-section and a mounting flange portion formed with both end portions of the single metal plate overlapped each other,
    wherein two of the three cables are covered by a common insulation to be integrated to form an integral cable having a substantially oval shape in a cross section thereof,
    wherein the single metal plate holds one of the three cables and the common insulation of the integral cable,
    wherein an engaging groove is formed on the integral cable, and
    wherein an engaging projection for engagement with the engaging groove is formed on the single metal plate of the cable clamp.

2. The conducting path according to claim 1, further comprising:
    a deformation preventing rib extending from a surface of the mounting flange portion opposite to a mounting surface to the single metal plate along outer peripheries of the one of the cables and the integral cable for preventing deformation of the mounting flange portion.

3. A conducting path, comprising:

three cables; and a cable clamp for fixing the three cables, wherein the cable clamp comprises a metal plate formed along an outer periphery of the three cables that are triangularly arranged when viewed in cross-section and a mounting flange portion formed with both end portions of the metal plate overlapped each other, wherein two of the three cables are integrated to form an integral cable, wherein the integral cable comprises two opposing planar portions between the two of the three cables, wherein the cable clamp further comprises a cable support member arranged between one of the cables and the integral cable so as to support the one of the cables and the integral cable, wherein the cable support member has a trapezoidal shape when viewed in a cross-section that an upper base thereof is formed in an arc shape so as to fit to a portion of an outer periphery of the one cable, a lower base horizontally wider than the upper base is formed flat so as to contact with one of the planar portions of the integral cable, and two sides each connecting an endpoint of the upper base to that of the lower base on both sides are constricted sides which are inwardly narrowed, and wherein the single metal plate is formed along an outer periphery of the integral cable comprising the planar portion that is not in contact with the cable support member, is subsequently formed along the constricted sides of the cable support member, and is further formed along both sides of an outer periphery of the one cable.

4. A conducting path, comprising:

three cables; and a cable clamp for fixing the three cables, wherein the cable clamp comprises a single metal plate formed along an outer periphery of the three cables that are triangularly arranged when viewed in cross-section and a mounting flange portion formed with both end portions of the single metal plate overlapped each other, wherein two of the three cables are covered by a common insulation to be integrated to form an integral cable having a substantially oval shape in a cross section thereof, wherein the single metal late holds one of the three cables and the common insulation of the integral cable, wherein the single metal plate comprises:

a first holding portion provided along an outer periphery of the one of the three cables and having a substantially circular shape in a cross section thereof, for holding the one of the three cables; and a second holding portion provided along an outer periphery of the integral cable and having a substantially oval shape in a cross section thereof, for holding the insulation of the integral cable.

5. The conducting path according to claim 4, wherein a size of the integral cable in a cross section thereof is larger than a space enclosed by the second holding portion.

6. The conducting path according to claim 4, wherein the integral cable comprises two opposing planar portions between the two of the three cables, wherein the cable clamp further comprises a cable support member arranged between one of the cables and the integral cable so as to support the one of the cables and the integral cable, wherein the cable support member has a trapezoidal shape when viewed in a cross-section that an upper base thereof is formed in an arc shape so as to fit to a portion of an outer periphery of the one cable, a lower base horizontally wider than the upper base is formed flat so as to contact with one of the planar portions of the integral cable, and two sides each connecting an endpoint of the upper base to that of the lower base on both sides are constricted sides which are inwardly narrowed, and wherein the single metal plate is formed along an outer periphery of the integral cable comprising the planar portion that is not in contact with the cable support member, is subsequently formed along the constricted sides of the cable support member, and is further formed along both sides of the outer periphery of the one cable.

7. The conducting path according to claim 4, wherein the integral cable comprises two opposing planar portions between the two of the three cables, and wherein the cable clamp further comprises a cable support member arranged between one of the cables and the integral cable to support the one of the cables and the integral cable.

8. The conducting path according to claim 7, wherein the cable support member has a trapezoidal shape when viewed in a cross-section that an upper base thereof is formed in an arc shape so as to fit to a portion of an outer periphery of the one cable, a lower base horizontally wider than the upper base is formed flat so as to contact with one of the planar portions of the integral cable, and two sides each connecting an endpoint of the upper base to that of the lower base on both sides are constricted sides which are inwardly narrowed.

9. The conducting path according to claim 8, wherein the single metal plate is formed along an outer periphery of the integral cable, is subsequently formed along the constricted sides of the cable support member, and is further formed along both sides of the outer periphery of the one cable.

* * * * *